3,851,089
METHOD FOR CONTINUOUSLY PANNING DOUGH
Victor F. Gugler, 8920 Helen Ave.,
Sun Valley, Calif. 91352
Original application Mar. 15, 1971, Ser. No. 124,052, now Patent No. 3,739,900. Divided and this application Feb. 7, 1973, Ser. No. 330,229
Int. Cl. A21d 8/02
U.S. Cl. 426—503
4 Claims

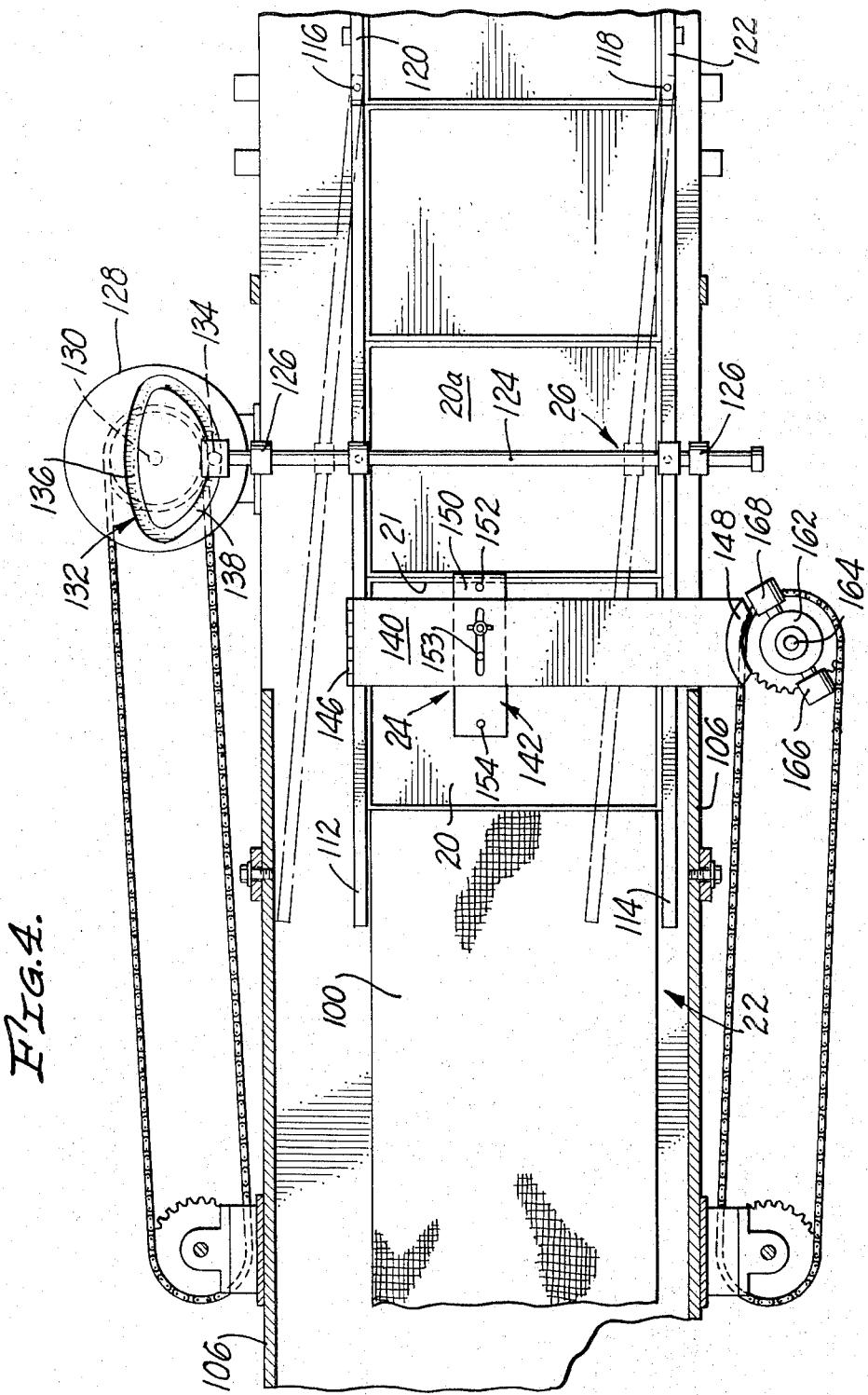

ABSTRACT OF THE DISCLOSURE

Method and apparatus for continuously forming and placing a series of dough pieces in a predetermined array on a pan by stepping the pan back and forth and in a forward direction under the forward end of a continuously moving dough conveyor.

---

This is a division of application Ser. No. 124,052, filed Mar. 15, 1971, now U.S. Pat. No. 3,739,900.

The present invention relates to dough processing apparatus for use in bakeries and the like and more particularly to an improved method and apparatus for continuously placing a series of dough pieces in pans, trays, sheets, and other open containers hereafter referred to generally as a "pan" or "pans."

One of the factors presently limiting the speed with which dough may be processed in bakeries is the speed with which dough pieces may be fed from a moving conveyor and accurately positioned in a pan. Such operation is commonly referred to as "panning" and is often accomplished by hand.

In an attempt to speed up panning operations, apparatus has been developed which directs a series of pans along a pan conveyor and under the forward end of a dough conveyor. The pans are periodically stopped and started by means engaging either the underside or top surface of a lead pan. Dough pieces fed along the dough conveyor are then permitted to drop onto forwardly displaced spaces on the lead pan which when full is released to travel with the pan conveyor. The panning operation is then repeated for the next pan and so on.

The panning apparatus heretofore developed is relatively complex, costly to construct and maintain, and is limited to forward motion control for pans. This means that for each separate row of dough pieces to be panned by the apparatus in use today, there must be a separate series of dough pieces fed along the dough conveyor. This requires duplication of dough-forming machinery which is quite expensive.

In view of the foregoing, it is an object of the present invention to provide a simple and inexpensive apparatus and method for continuously panning dough pieces and which is capable of controlling both the forward as well as the lateral position of pans on a moving pan conveyor to thereby permit a number of rows of dough pieces to be accurately placed in a pan from a single series of dough pieces fed along a dough conveyor.

Another object of the present invention is to provide an improved method and apparatus of the foregoing character which is capable of operating at higher speeds than presently available panning apparatus.

A further object of the present invention is to provide high speed apparatus for automatically and accurately panning dough pieces including a selectively operable pan stop for engaging and halting the lead pan of a series of pans on a moving pan conveyor, laterally movable pan guide means for engaging and controlling the lateral position of the lead pan, and means for operating the pan stop and pan guide means in synchronism to rapidly and accurately step the lead pan from side to side and in a forward direction along the pan conveyor to receive dough pieces in a predetermined array as they fall from the forward end of a dough conveyor.

Other objects and advantages of the present invention may be more clearly understood by reference to the following detailed description when taken with the drawings which, by way of example only, illustrate one form of panning apparatus embodying the features of the present invention.

In the drawings:

FIG. 4 is a fragmentary top view similar to FIG. 3 with the dough conveyor and cutter removed to expose the pan conveyor and mechanisms for regulating the forward and lateral movement of a series of pans on the pan conveyor;

FIG. 5 is a fragmentary side view of the stop means of the apparatus of the present invention illustrated in FIGS. 1–4; and FIG. 6 is a diagrammatic top view of a pan on the pan conveyor illustrating by consecutive numbers the drop points for two series of dough pieces with forward and lateral movement of the pan under the forward end of the dough conveyor.

Figure 1:
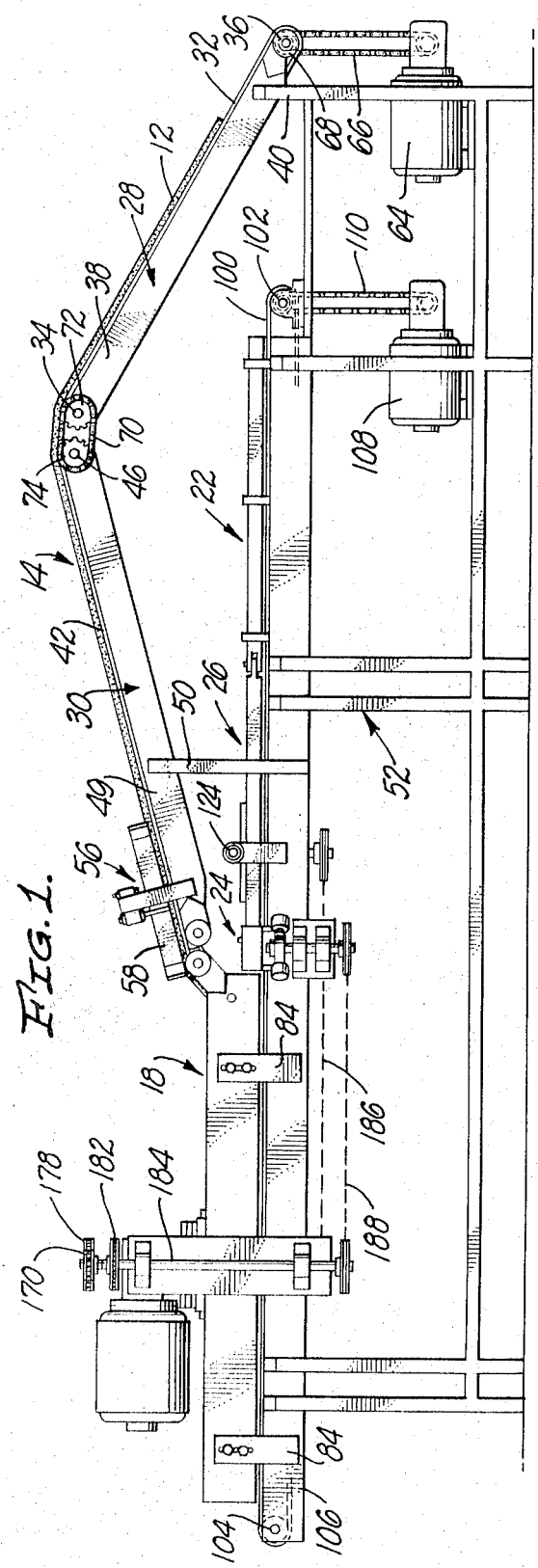
FIG. 1 is a side view of a panning apparatus including the features of the present invention.
Figure 2:
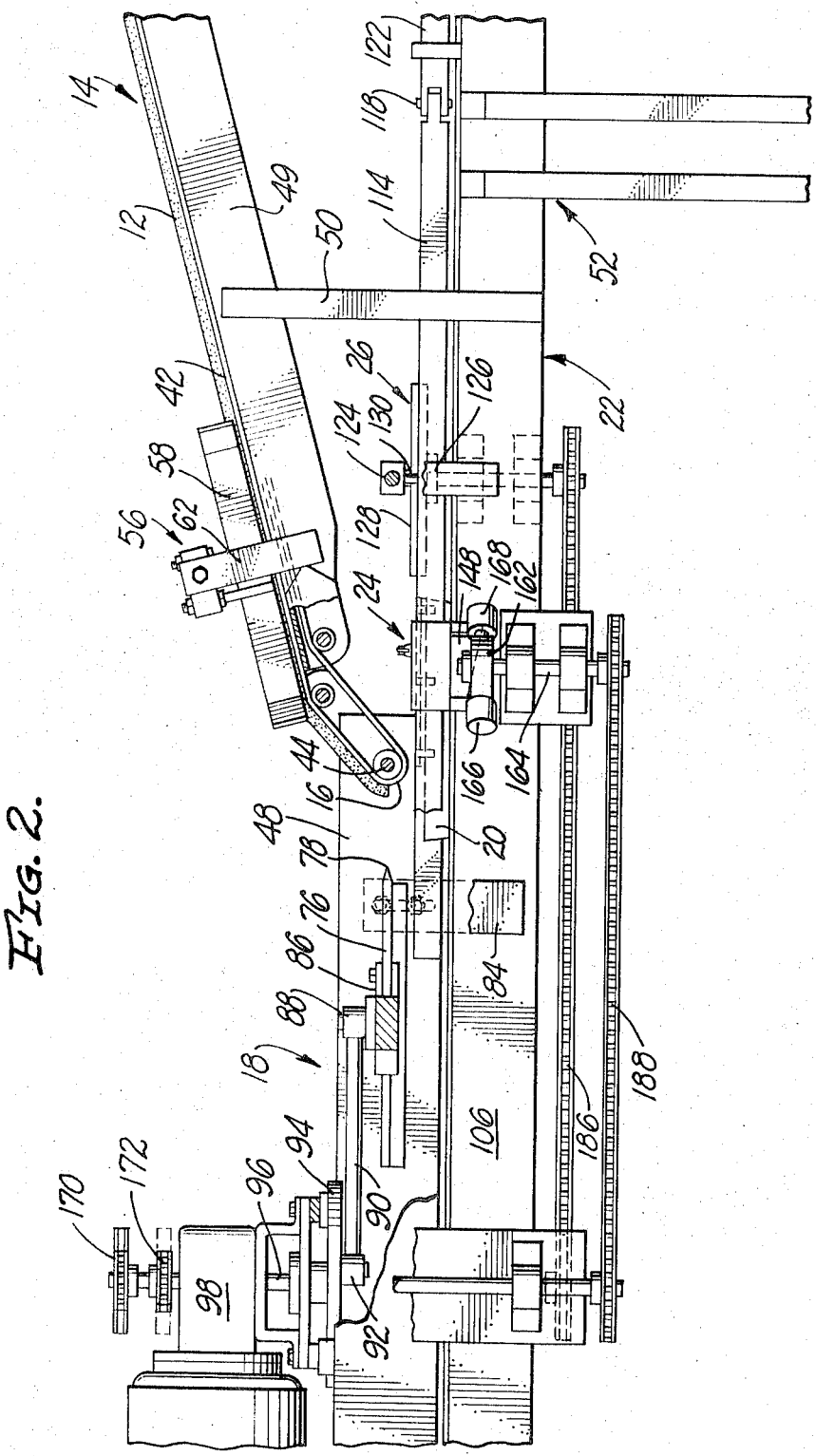
FIG. 2 is a fragmentary side view of a portion of the panning apparatus illustrated in FIG. 1 showing the forward end of a dough conveyor in combination with a cutter and means for controlling the positioning of pans moving on a pan conveyor below the dough conveyor.
Figure 3:
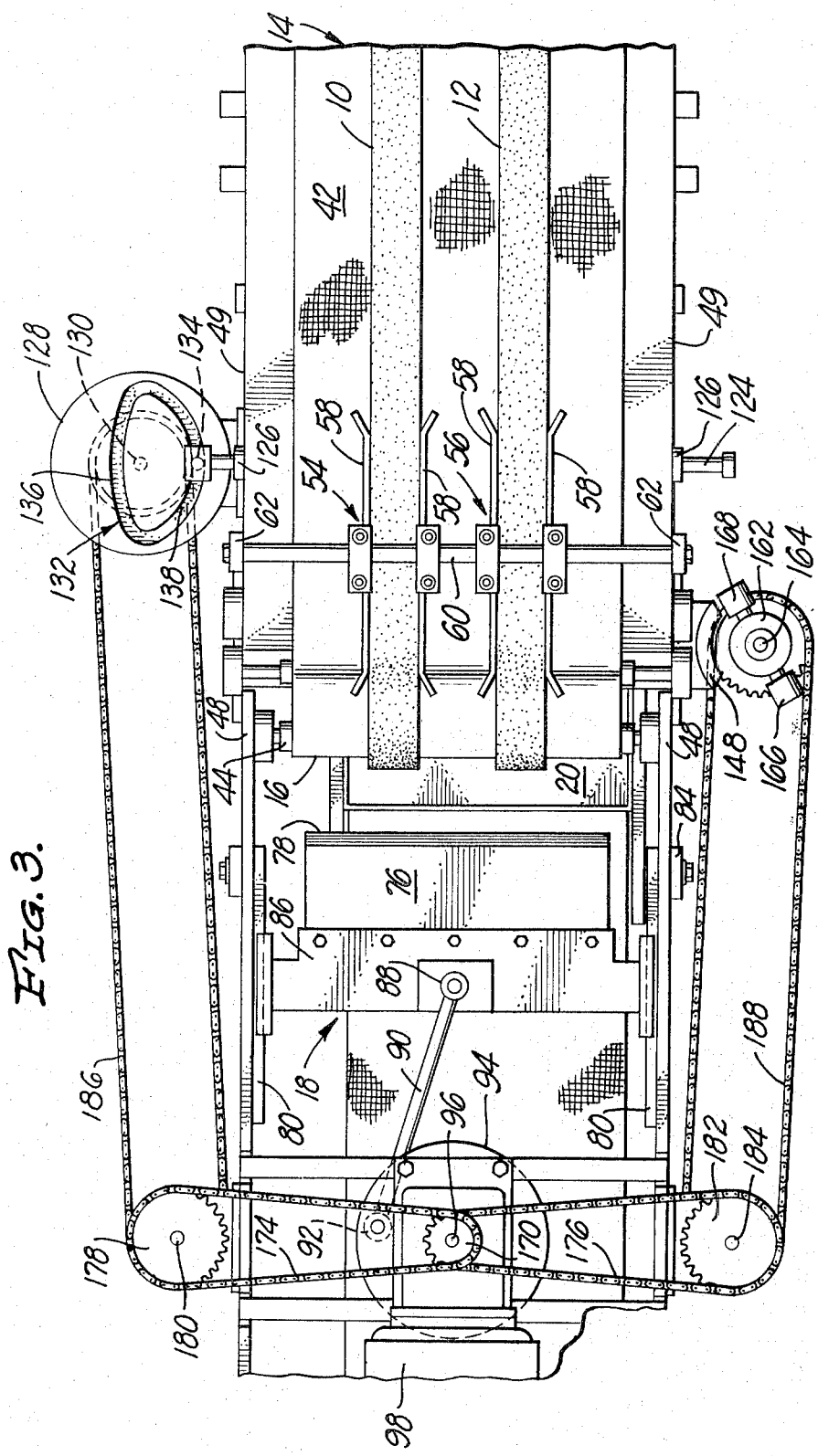
FIG. 3 is a fragmentary top view of the apparatus illustrated in FIG. 2.

Generally speaking, and with reference to the apparatus shown in FIGS. 1, 2, and 3 in the process of the present invention, dough in the form of one or more relatively narrow parallel strips, such as 10 and 12, is transported in a forward direction along the top surface of a dough conveyor 14 toward a forward end 16 thereof. At the forward end 16, the dough strips 10 and 12 are periodically severed by a cutter 18 such that relatively short dough pieces fall from the forward end 16 downwardly onto a lead pan 20 positioned on a pan conveyor 22 below the dough conveyor 14 and cutter 18. The pan conveyor 22 is continuously moving in a forward direction while the position of the lead pan 20 is controlled by stop means 24 and pan guide means 26. The stop means 24 is adapted to engage and halt the lead pan 20 at various positions on the pan conveyor, while the pan guide means 26 is adapted to engage and control the lateral position of the lead pan on the pan conveyor. The operation of the pan stop means 24 and pan guide means 26 is synchronized with operation of the cutter 18 such that the lead pan 20 is selectively stepped from side to side and in a forward direction under the forward end 16 of the dough conveyor 14 to receive the dough pieces in a predetermined array as they fall from the dough conveyor. The array of dough pieces received by the lead pan 20 may be as illustrated in FIG. 6 including four rows and three columns of dough pieces. When the lead pan 20 is filled, as indicated in FIG. 6, it is advanced with the pan conveyor 22 and replaced by the next pan 20a in a series of pans on the conveyor 22. Pan 20a then becomes the lead pan and is selectively moved from side to side and in a forward direction by operation of the stop means 24 and pan guide means 26 to receive a like array dough pieces.

From the foregoing brief description, it is to be appreciated that the method and apparatus of the present invention for panning dough is simple yet fully automatic. Moreover, the ability of the apparatus to move the lead pan 20 from side to side as well as selectively stepping it in a forward direction permits the lead pan to be completely filled with a plurality of rows of dough pieces from a single or pair of dough strips severed by operation of the cutter 18. This eliminates the need for duplication of apparatus for forming dough strips for each row of dough pieces to be placed in the pan.

Further, being synchronized to operation of the cutter, the panning apparatus of the present invention may be closely regulated to accurately position dough pieces in corresponding spaces on each successive pan. This allows other apparatus synchronized to movement of the pan conveyor to accurately dispense food items onto the dough pieces such as nuts and the like, thereby eliminating further manual operations in the bakery process with which the apparatus of the present invention is associated.

Referring now more specifically to the drawings, and in particular to FIGS. 1, 2, and 3, the dough conveyor 14 comprises a first upwardly inclined section 28 and a second downwardly inclined section 30. The first section 28 comprises a continuous belt 32 extending around and between a pair of horizontal substantially parallel shafts 34 and 36. The shafts are supported for turning about their respective longitudinal axes by side members 38 extending along opposite sides of the belt in a forward direction. The shaft 34 is supported at a forward upward end of the side members 38, while the shaft 36 is supported at a lower rearward end of the side members, the lower end of the side members being connected to vertical legs 40 supporting the first conveyor section 28 above the pan conveyor 22.

Like the first section, the second section 30 includes a continuous belt 42 extending around and between horizontal substantially parallel shafts 44 and 46. The shafts are supported for turning about their respective longitudinal axes by side members 48 and 49 extending along opposite sides of the belt 42 in a forward direction. The shaft 44 is supported at a forward end of the side members 48 and at the forward end 16 of the conveyor 14 while the shaft 46 is supported at the rearward upper end of the side members 49 which are secured to the forward upper end of the side members 38. The side members 49 are further supported by verticals 50 extending from the top of a table structure 52 supporting the pan conveyor 22 such that the dough conveyor 14 lies over a rearward portion of the pan conveyor with the forward end 16 adjacent the cutter 18.

Also supported from the side members 49 is a pair of dough strip guides 54 and 56. The dough guides are of similar construction and each includes a pair of vertically extending parallel plates 58 having outwardly diverging forward and rear ends. The plates are connected to a cross arm 60 supported by verticals 62 extending from the tops of the side members 49 and are spaced from each other to receive and guide the dough strips 10 and 12 as they move along the top of the belt 42 toward the forward end 16 of the dough conveyor.

The upper surface of the conveyor 14 is continuously moving in a forward direction. This is accomplished by a motor drive 64 having its output coupled as by a chain 66 to a sprocket 68 on the shaft 36. Operation of the motor drive 64 produces a turning of the sprocket 68 and hence a continuous forward movement of the upper surface of the belt 32. The movement of the belt produces a turning of the shaft 34 which in turn drives the shaft 46 as by a chain 70 extending around and between sprockets 72 and 74 on the shafts 34 and 46 respectively. Thus, the strips of dough 10 and 12 being introduced to the belt 32 travel therewith upwardly to the belt 42 and then downwardly between the dough guides 54 and 56 to the forward end 16 of the conveyor 14 where they are periodically severed by the cutter 18.

As illustrated most clearly in FIGS. 2 and 3, the cutter 18 comprises a generally rectangular flat blade 76 having a sharp cutting edge 78. Opposite sides of the blade ride in channels (not shown) formed in a horizontal blade guides 80. The blade guides are secured to side members 48 supported by verticals 84 above the table structure 52. The blade 76 is held between support plates 86 and is pivotally coupled at 88 to one end of a drive rod 90. The opposite end of the drive rod 90 is pivotally coupled at 92 to a flywheel 94 secured to the drive shaft 96 of a motor drive 98. As the drive shaft turns in response to operation of the motor 98, the drive rod 90 is reciprocated to slide the blade 76 back and forth in the blade guides 80 with the cutting edge 78 periodically severing the dough strips 10 and 12 as they curl downwardly over the forward end 16 of the dough conveyor 14. This is accomplished without the blade actually severing or otherwise damaging the belt 42 as it passes around the shaft 44.

As the blade 76 severs the dough strips 10 and 12, dough pieces fall from below the blade onto the lead pan 20 which is selectively positioned below the forward end 16 of the dough conveyor 14 on the pan conveyor 22.

As most clearly illustrated in FIG. 1, the pan conveyor 22 comprises a continuous belt 100 extending around and between shafts 102 and 104. Opposite ends of the shafts are supported by parallel side members 106 of the table structure 52 for turning about their respective longitudinal axes. The shaft 102 is supported at a rear end of the side members 106 while the shaft 104 is supported at a forward end of the side members. Other horizontal shafts extend between the side members 106 and provide additional vertical support for the belt 100.

The pan conveyor 22 is continuously driven in a forward direction. To accomplish this, the drive shaft of a motor 108 is coupled to the shaft 102 by a chain 110 extending around and between sprockets on the motor drive shaft and shaft 102. Operation of the motor 108 thus produces a turning of the shaft 102 and continuous forward movement of a top surface of the belt 100 to move the series of pans including the lead pan 20 under the forward end of the dough conveyor 14.

As previously indicated, the lead pan 20 is selectively stepped from side to side and in a forward direction under the forward end 16 of the dough conveyor 14 to receive the dough pieces as they fall from the forward end 16 in an array similar to that illustrated in FIG. 6. The stop means 24 and pan guide means 26 provide the selective control for stepping the lead pan 20 from side to side and in a forward direction.

More particularly, as illustrated in FIG. 4, the pan guide means 26 comprises a pair of laterally movable pan guide arms 112 and 114. The pan guide arms extend in a forward direction over the top of the pan conveyor 22, are parallel to each other, and are adapted to engage opposite sides of the lead pan 20. Rear ends of the movable guide arms are pivotally connected at 116 and 118 to the forward ends of fixed horizontal guide pan arms 120 and 122 extending over the top of the conveyor 22 to guide the series of pans forward along the pan conveyor. A control arm 124 extends across the top of the pan conveyor, is supported for sliding movement in verticals 126 secured to the side members 106, and is connected to the movable pan guide arms 112 and 114. The control arm maintains the parallel relationship between the guide arms 112 and 114 and imparts lateral movement to the arms and hence to the lead pan 20 when it is desired to move the lead pan from side to side on the pan conveyor 22.

Various means may be employed to selectively swing the movable pan guide arms 112 and 114 over the top of the pan conveyor 22 to step the lead pan 20 between a plurality of lateral positions. In the illustrated form of the invention, such control means comprises a disc 128 supported for turning on a vertical shaft 130. Formed in the top of the disc is a closed loop cam slot 132 in which rides a follower 134 connected to one end of the control arm 124. The cam slot 132 may take various shapes depending upon the number of lateral positions to be assumed by the lead of pan 20. Using two dough strips to produce the array of dough pieces on the lead pan 20 illustrated in FIG. 6, two lateral positions are required for the lead pan. This is produced by a cam slot having a general shape similar to that shown in FIGS. 3 and 4 wherein there is an arc 136 of about 160° having a relatively small radius joined to an arc 138 of about 160° of a relatively large radius. As the follower 134 moves in the cam slot 132, it causes the control arm 124 to reciprocate back and forth between first and second positions. The first and second positions correspond to the follower 134 being in the arc 138 and 136 respectively. Such motion of the control arm 124 produces a lateral swinging of the movable pan guide arms 112 and 114 between first and second positions as illustrated in FIG. 4 to laterally step the lead pan 20 between corresponding first and second lateral positions illustrated in FIG. 6.

Likewise, various means may be employed to selectively stop the lead pan 20 at various positions in a forward direction under the forward end 16 of the dough conveyor 14. In the illustrated form of the invention, and as most clearly represented in FIGS. 4 and 5, the pan stop means 24 comprises a control plate 140 carrying a pin carrier 142. The control plate 140 is hinged at 146 to the movable pan guide arm 112 and extends laterally across the top of the pan conveyor 22 over the pan guide arm 114 to a point just beyond the side member 48 of the table structure 52. There, the control plate 140 bends downwardly at right angles and carries on its lower end a pad 148 having a lower face which is upwardly inclined in a forward direction. The pin carrier 142 comprises a plate 150 having a plurality of pins 152, 153, and 154 extending downwardly therefrom. The pins are equally spaced from each other in a forward direction. The number of pins depends upon the number of positions at which it is desired to stop the lead pan 20 under the forward end 16 of the dough conveyor 14. In the illustrated form of the invention, it is desired to stop the pan 20 at three different forward positions. Thus, three equally spaced pins extend downwardly from the carrier plate 150 and each is adapted to selectively engage the rear lip 21 of the lead pan 20 as illustrated in FIG. 5. The pin carrier 142 is secured to the control plate 140 as by a bolt 156 extending upwardly from the carrier plate 150 through an opening 158 in the control plate 140 to receive a wing nut 160. The opening 158 is elongated in a forward direction to permit selected pre-positioning of the carrier plate 150 by loosening the wing nut 160 and sliding the plate to the desired position relative to the control plate 140 and then tightening the wing nut.

From the showing of FIG. 5, it is appreciated that upward lifting of the carrier plate 150 will permit the lead pan 20 to be released from the pin 152 and to move forward with the pan conveyor 22 under the forward end 16 of the dough conveyor 14. If the carrier plate 150 is lowered, the rear lip 21 of the lead pan 20 will engage the next pin 153 to halt the lead pan in a second stop position. The same operation is repeated for a subsequent raising of the carrier plate 150 and a lowering to cause the pin 154 to engage the rear lip 21 of the lead pan. This occurs at a third-stop position. The three-stop positions are diagrammatically illustrated in FIG. 6.

Various means may be provided for selectively lifting the carrier plate 150 to allow the lead pan to advance between the three stop positions. In the illustrated form of the invention, such control is provided by a horizontal wheel 162 secured to a vertical shaft 164. Rollers 166 and 168 are secured to the peripheral surface of the wheel 162 for a turning therewith. As the wheel turns, the roller 166 engages the inclined face of the pad 148 to cause a lifting of the control plate 140 and hence the carrier plate 150 to release the pin 152 from the rear lip 21 of the lead pan 20 and allow the pan to advance with the moving pan conveyor 22. The lifting of the carrier plate 150 is only momentary since the wheel 162 continues to rotate. As the roller 166 exits from the pad 148, the control plate 140 again falls to engage the top of the movable guide arm 114. This occurs prior to the lead pan 20 reaching the pin 153 which engages the rear lip 21 of the pan to stop the pan in its second stop position. This operation is repeated when the roller 168 engages the pad 148 to again lift the carrier plate 150.

As previously discussed, the operation of the pan guide means 26 and the operation of the stop means 24 are synchronized and are preferably synchronized with operation of the cutter 18 such that the lead pan 20 is selectively stepped from side to side in a forward direction to receive the dough pieces in a predetermined array as they fall from the forward end 16 of the dough conveyor 14. Preferably, and when two series of dough pieces are produced by operation of the cutter, as in the illustrated example, the lead pan 20 is first stepped to one side, then forward, then to an opposite side, then forward, and then again to the first side. Referring to FIG. 6, the preferred stepping of the lead pan is from the lateral position No. 1 to the lateral position No. 2, to the stop position No. 2, to the lateral position No. 1, to the stop position No. 3, to the lateral position No. 2, and so on.

To produce the desired synchronization of the stop means 24 and pan guide means 26 to the operation of the cutter 18, the drive shaft 96 of the motor 98 for the cutter 18 carries two coincident sprockets 170 and 172 around which pass chains 174 and 176. The chain 174 extends around a slightly larger sprocket 178 supported on a vertical shaft 180 located on one side of the cutter while the chain 176 passes around a similar slightly larger sprocket 182 mounted on a vertical shaft 184 located at an opposite side of the cutter. The sprockets 178 and 182 are dimensioned such that the sprockets rotate once for each four revolutions of the sprockets 170 and 172 on the motor drive shaft 96. The shafts 180 and 184 are coupled, as by chains 186 and 188 and cooperating sprockets, to the shafts 164 and 130 supporting the wheel 162 and cam disc 128 respectively, such that the wheel and cam disc turn with the shafts 180 and 184 in a 1:1 relationship.

Further, the angular relationship between hte cam disc 128 and wheel 162 is pre-adjusted. The pre-adjustment is such that the roller 166 will engage the pad 148, lift the carrier plate 150, and hence release the lead pan 20 immediately after the follower 134 enters the arc 136, that is, the portion of the cam slot 132 having a relatively small radius, and immediately after the cutter 18 has operated to sever the strips 10 and 12 and deposit dough pieces in the spaces marked "2" in FIG. 6. Thus pre-adjusted, the roller 168 will engage the pad 148, lift the carrier plate 150, and release the pin 153 from the lead pan immediately after the follower 134 has entered the arc 138, that is, the portion of the cam slot having a relatively large radius, and after the cutter has operated to sever the dough strips and deposit the dough pieces in the spaces marked "4" in FIG. 6.

Thus synchronized, the dough pieces are deposited in the array illustrated in FIG. 6 as follows: two dough pieces are deposited when the lead pan 20 is in the lateral position No. 1 in the spaces represented by the numerals "1"; the lead pan is then shifted to lateral position No. 2 and two dough pieces are deposited in the spaces illustrated by the numeral "222"; the stop means 24 is then released and the lead pan advance to the stop position No. 2 where two dough pieces are deposited on the pan in spaces represented by the numeral "3"; the lead pan is then shifted to the lateral position No. 1 where two dough pieces are deposited in the spaces illustrated by the numeral "4"; the stop means is then momentarily released and the lead pan advanced to the stop position No. 3 where two dough pieces are deposited in the spaces marked by the numeral "5"; the lead pan is then shifted to the lateral position No. 2 where two dough pieces are deposited in the spaces indicated by the numeral "6"; the stop means is then momentarily released to allow the lead pan to advance with the conveyor 22 while the pan 20a moves to engage the pin 152. Pan 20a then assumes the roll of the lead pan in lateral position No. 2 and the above operation continues.

From the foregoing description, it should be appreciated that the present invention provides an extremely simple yet highly efficient apparatus and method for automatically and rapidly panning dough pieces as they fall from the forward end of a moving conveyor. Because of the extreme accuracy with which the present invention deposits dough pieces on a pan and because of the speed of operation of the panning method and apparatus, the present invention makes possible the mechanization of subsequent bakery operations such as the regulated dispensing of nuts, cinnamon, and the like to the tops of the dough pieces and permits a substantial increase in the rate at which bakery products may be processed within a bakery.

While a particular apparatus and process have been described in detail herein, changes and modifications may be made without departing from the spirit of the invention. It is therefore intended that the present invention be limited in scope only by the terms of the following claims.

I claim:

1. A process for placing dough pieces in an orderly array in a series of pans comprising the steps of:
   moving a series of pans under and in a forward direction of movement of dough on a dough conveyor;
   halting forward movement of a lead one of said series of pans to arrest forward movement of said series of pans when said lead pan is under a forward end of said dough conveyor and while arresting said series of pans against forward movement laterally moving said lead pan to one side to catch dough pieces falling from said forward end of said dough conveyor at laterally spaced locations on said lead pan;
   releasing said lead pan for forward movement of said series of pans to a new position under said forward end of said dough conveyor; and
   again arresting said lead pan and said series of pans against forward movement while laterally moving said lead pan to an opposite side to catch dough pieces at different laterally spaced locations on said lead pan.

2. The process of claim 1 wherein said dough moving on said dough conveyor comprises a plurality of laterally spaced longitudinally extending dough strips and wherein said process further includes the step of severing dough pieces from forwardmost end-portions of said dough strips in synchronism with said lateral movements of said lead pan.

3. A process for placing dough pieces in an orderly array in a series of pans comprising the steps of:
   moving dough in a forward direction on a continuously forward moving dough conveyor;
   moving a series of pans in a forward direction on a continuously forward moving pan conveyor belt below said dough conveyor;
   halting a lead one of said series of pans under a forward end of said dough conveyor to stop forward movement of said series of pans while said pan conveyor belt continues to move thereunder;
   while holding said series of pans against forward movement on said pan conveyor belt, sliding said lead pan laterally in one direction to catch dough pieces falling from said forward end of said dough conveyor at laterally spaced locations on said lead pan;
   releasing said lead pan for forward movement of said series of pans on said pan conveyor belt to a new position for said lead pan under said forward end of said dough conveyor;
   halting said lead pan in said new position to again stop forward movement of said series of pans while said pan conveyor belt continues to move thereunder; and
   while holding said series of pans against forward movement on said pan conveyor belt, sliding said lead pan laterally in an opposite direction to catch dough pieces at different laterally spaced locations on said lead pan.

4. The process of claim 3 wherein said dough moving on said dough conveyor comprises a plurality of laterally spaced longitudinally extending dough strips and wherein said process further includes the step of severing dough pieces from forwardmost end-portions of said dough strips in synchronism with said lateral movements of said lead pan.

References Cited

UNITED STATES PATENTS

| | | | |
|---|---|---|---|
| 1,753,393 | 4/1930 | Van Houten | 425—150 |
| 1,781,546 | 11/1930 | Harber | 425—150 |
| 2,590,823 | 3/1952 | Rhodes | 53—244 X |
| 2,709,974 | 6/1955 | Hunter et al. | 53—244 X |
| 2,728,508 | 12/1955 | Marasso | 425—434 X |

JAMES R. HOFFMAN, Primary Examiner

U.S. Cl. X.R.

426—496